(12) United States Patent
Kong et al.

(10) Patent No.: US 9,037,950 B2
(45) Date of Patent: May 19, 2015

(54) METHOD FOR OPERATING MEMORY CONTROLLER AND DEVICES HAVING THE SAME

(71) Applicant: Samsung Electronics Co., Ltd., Suwon-si (KR)

(72) Inventors: Jae Phil Kong, Seoul (KR); Soong Mann Shin, Suwon-si (KR); Myung Suk Choi, Suwon-si (KR); Sin Ho Yang, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 146 days.

(21) Appl. No.: 13/727,194

(22) Filed: Dec. 26, 2012

(65) Prior Publication Data
US 2013/0268803 A1    Oct. 10, 2013

(30) Foreign Application Priority Data
Apr. 9, 2012   (KR) .................. 10-2012-0036515

(51) Int. Cl.
G06F 11/10    (2006.01)
(52) U.S. Cl.
CPC ............ *G06F 11/10* (2013.01); *G06F 11/1052* (2013.01)
(58) Field of Classification Search
CPC ............ H03M 13/65; H03M 13/6502; H03M 13/6505
USPC ........... 714/718–723, 710–711; 365/200–201
See application file for complete search history.

(56) References Cited

U.S. PATENT DOCUMENTS

| | | | |
|---|---|---|---|
| 7,849,383 B2 * | 12/2010 | Lin ............... | 714/763 |
| 8,370,727 B2 * | 2/2013 | Yang ............. | 714/781 |
| 2002/0162069 A1 | 10/2002 | Laurent | |
| 2004/0257888 A1 * | 12/2004 | Noguchi et al. ... | 365/200 |
| 2009/0187812 A1 | 7/2009 | Abe | |

FOREIGN PATENT DOCUMENTS

| | | |
|---|---|---|
| JP | 2001-101084 A | 4/2001 |
| JP | 2001-196938 A | 7/2001 |
| JP | 2005-4947 A | 1/2005 |
| JP | 2009-171347 A | 7/2009 |
| KR | 10-0883654 B1 | 2/2009 |

* cited by examiner

*Primary Examiner* — Steve Nguyen
(74) *Attorney, Agent, or Firm* — Sughrue Mion, PLLC (57) ABSTRACT

A memory controller and an operating method of the memory controller are provided. The operating method includes: performing error correction on data, including a plurality of chunks, in a unit of a chunk; determining if a coefficient of each term of which a degree is equal to or greater than a degree of a reference-degree term, in an error location polynomial for a last chunk among the plurality of chunks, is all zero; and controlling an output time of an error-corrected first chunk based on a result of the determining.

9 Claims, 9 Drawing Sheets

METHOD FOR OPERATING MEMORY CONTROLLER AND DEVICES HAVING THE SAME

CROSS-REFERENCE TO RELATED APPLICATIONS

This application claims priority under 35 U.S.C. §119(a) from Korean Patent Application No. 10-2012-0036515 filed on Apr. 9, 2012, the disclosure of which is hereby incorporated by reference in its entirety.

BACKGROUND

1. Field

Apparatuses and methods consistent with exemplary embodiments of the inventive concept relate to a memory controller, and more particularly, to a memory controller controlling an output timing of an error-corrected first chunk, and devices having the memory controller.

2. Description of the Related Art

In a data processing system, data may be changed during transmission. Accordingly, for a reliable data communication, changed data should be detected and corrected. As a method for detecting the changed data, parity check, cyclical redundancy check or checksum is used.

As a method for correcting an error included in the data, there is provided a method that a receiving device requires retransmission of the data from a transmitter or a method that the receiving device corrects an error included in the data automatically by using an error correction code (ECC). A data processing system, which uses a method of correcting an error included in the data, needs time for correcting the error during a read operation, so that performance of the read operation of the data processing system may be deteriorated.

SUMMARY

One or more exemplary embodiments provide an operating method of a memory controller, the method including: performing error correction on data, including a plurality of chunks, in a unit of a chunk; determining if a coefficient of each term of which a degree is equal to or greater than a degree of a reference-degree term, in an error location polynomial for a last chunk among the plurality of chunks, is all zero; and controlling an output time of an error-corrected first chunk based on a result of the determining.

The controlling the output time may include: outputting the error-corrected first chunk before error correction on the last chunk is completed if it is determined that the coefficient of the each term is all zero; and performing error correction on the last chunk before outputting the error-corrected first chunk if it is determined that a coefficient of any term of which a degree is equal to or greater than the degree of the reference-degree term, in the error location polynomial for the last chunk among the plurality of chunks, is not zero.

The controlling the output time may include outputting the error-corrected first chunk while a root of the error location polynomial for the last chunk is calculated or while error correction on the last chunk is performed using a plurality of error locations corresponding to the calculated root if it is determined that the coefficient of the each term is all zero.

One or more exemplary embodiments provide a memory controller including: a memory interface through which data is input; and an error correction code (ECC) block which controls to perform error correction on the data, comprising a plurality of chunks in a unit of a chunk; to determine if a coefficient of each term of which a degree is equal to or greater than a degree of a reference-degree term, in an error location polynomial for a last chunk among the plurality of chunks, is all zero; and to determine an output time of an error-corrected first chunk based on a result of the determining if the coefficient of the each term is all zero.

The ECC block may control: to output the error-corrected first chunk before error correction on the last chunk is completed if it is determined that the coefficient of each term is all zero; and to perform error correction on the last chunk before outputting the error-corrected first chunk if it is determined that a coefficient of any term of which a degree is equal to or greater than the degree of the reference-degree term, is not zero.

The memory controller may be packaged in a package along with a memory. The ECC block may control to output the error-corrected first chunk while a root of the error location polynomial for the last chunk is calculated or while error correction on the last chunk is performed using a plurality of error locations corresponding to the calculated root, if it is determined that the coefficient of the each term is all zero.

The error correction code block may calculate a syndrome value for each of the plurality of chunks, calculates an error location polynomial for the each chunk from the calculated syndrome value, calculates a root of the calculated error location polynomial for the each chunk, outputs at least one error location corresponding to the calculated root, and generates an indication signal based on the result of the determination. The memory controller may further include: a memory which stores the data input through the memory interface; a correction direct memory access (DMA) which corrects an error included in each of the plurality of chunks stored in the memory using the at least one error location on each of the plurality of chunks and stores each of the error-corrected chunks in the memory; and a host DMA which determines the output time of the error-corrected first chunk stored in the memory in response to an indication signal output from the ECC block.

If the ECC block determines that the coefficient of the each term is all zero, the host DMA outputs the error-corrected first chunk in response to the indication signal output from the ECC block while the ECC block calculates the root of the error location polynomial for the last chunk.

The memory controller may further include: an OR gate which receives the indication signal which is output from the ECC block and an error correction completion signal which is output from the correction DMA and indicates that the error correction on the last chunk is completed, and performs an operation on the two signals to generate a transmission control signal. The host DMA may control the output time of the error-corrected first chunk based on the transmission control signal.

According to an aspect of an exemplary embodiment, there is provided a memory system which includes: the above memory controller; and a card interface for data communication between a host and the memory system, wherein the memory system is a memory card.

According to an aspect of another exemplary embodiment, there is provided a memory system which includes: the above memory controller; a dynamic random access memory (DRAM); and a buffer manager for controlling storage of the data, which is transmitted or received between the memory controller and a host, in the DRAM, wherein the memory system is a solid stage drive (SSD).

According to an aspect of still another exemplary embodiment, there is provided an electronic device which includes:

the above memory controller; and a host for controlling an operation of the memory controller.

The electronic device may further include: a radio transceiver; and a display, wherein the memory controller transmits an error-corrected data to the radio transceiver or the display according to a control of the host.

The electronic device may further include: an image sensor for converting an optical image into a digital image; and a display. The memory controller may program the digital image output from the image sensor in a non-volatile memory and transmits error-corrected object data to the display.

DETAILED DESCRIPTION OF THE EXEMPLARY EMBODIMENTS

Figure 1:
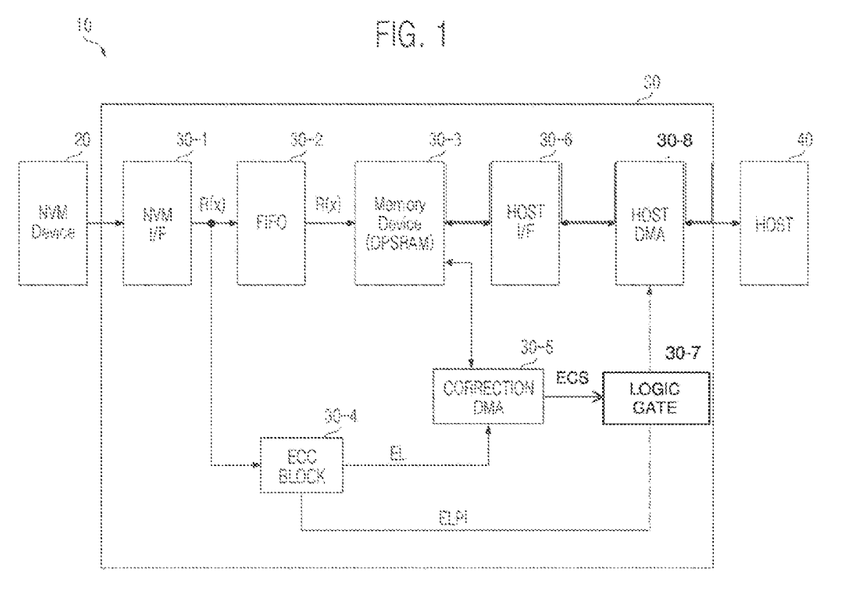
FIG. 1 is a block diagram of a memory system including a memory controller according to an exemplary embodiment of the present inventive concepts.

FIG. 1 is a block diagram of a memory controller according to an exemplary embodiment. Referring to FIG. 1, a memory system 10 includes a non-volatile memory 20, a memory controller 30 and a host 40.

The memory system 10 may be embodied in a personal computer (PC), a tablet PC, a laptop computer, a memory card, a smart card, a cellular phone, a smart phone, a data server, a hard disk drive (HDD), a solid state drive (SSD) or a network-attached storage (NAS).

According to exemplary embodiments, the non-volatile memory 20 and the memory controller 30 may be packaged in a package, e.g., a multi-chip package.

The non-volatile memory 20 may be embodied in an Electrically Erasable Programmable Read-Only Memory (EEPROM), a NAND flash memory, a resistive memory or a phase change random access memory (PRAM). The non-volatile memory 20 stores a plurality of code words and transmits the plurality of code words successively to the memory controller 30 during a read operation.

The plurality of code words may be divided in a unit of a chunk. According to an exemplary embodiment, the chunk may mean an error correction code (ECC) processing unit processed in an ECC block 30-4. According to another exemplary embodiment, the chunk may mean a piece of data partitioned from object data, e.g., page data which the host 40 may process all at once.

The object data may be in a form of a file or another form. For example, the object data may be documents, image files, video files, audio files, backup files, sequence of data or collections of data.

During a write operation or a program operation, the memory controller 30 writes or programs data output from the host 40 in the non-volatile memory 20. In addition, during a read operation, the memory controller 30 performs error correction on a chunk output from the non-volatile memory 20 by chunk and transmits an error-corrected chunk to the host 40.

During a read operation, the memory controller 30 determines if a coefficient of each term of which a degree is equal to or greater than a degree of a reference-degree term, in an error location polynomial for a last chunk among a plurality of chunks included in object data, e.g., a page data, is all zero, and controls an output time or timing of an error-corrected first chunk based on the determination result.

In other words, if coefficients of terms of which respective degrees are equal to or greater than a degree of the reference-degree term, in the error location polynomial for the last chunk, are all zero, the memory controller 30 outputs first an error-corrected first chunk stored in a memory device 30-3 to the host 40 before error correction on the last chunk is completed. That is, as early transfer of a first chunk is possible, speed of a read operation of the memory controller 30 during a read operation gets increased.

When a coefficient of a term of which a degree is equal to or greater than a degree of a reference-degree term, in an error location polynomial for a chunk, is zero, an error included in the chunk may be a correctible error.

For example, when an error location polynomial for a last chunk has terms up to an nth-degree term, e.g., n is 10, as shown in Equation 1 and a degree of a reference-degree term is eight, the memory controller 30 determines if coefficients of an eighth-degree term, a ninth-degree term and a tenth-degree term in the error location polynomial for the last chunk are all zero, and if it is determined that the coefficients are all zero, the memory controller 30 outputs first an error-corrected first chunk stored in the memory device 30-3 to the host 40 before error correction on the last chunk is completed.

$$f(x)=a_n x^n + a_{n-1} x^{n-1} + a_{n-2} x^{n-2} + \ldots + a_2 x^2 + a_1 x^1 + a_0 \quad \text{[Equation 1]}$$

Here, each $a_i x^i$ means a term, i means a degree of the term, and each a, means a coefficient. N is a non-negative integer.

The memory controller 30 includes a non-volatile memory interface 30-1, a first-in first-out (FIFO) buffer 30-2, a memory device 30-3, an error-correction code (ECC) block 30-4, a correction direct memory access (DMA) 30-5, a host interface 30-6, a logical gate 30-7 and a host DMA 30-8.

The non-volatile memory interface (or interface unit) 30-1 interfaces data transmitted or received between the non-volatile memory 20 and the FIFO buffer 30-2. For example, the non-volatile memory interface 30-1 may convert data R(x) output from the non-volatile memory 20 into data which the FIFO buffer 30-2 and/or the ECC block 30-4 may process during a read operation. In addition, the nonvolatile memory interface 30-1 may convert data output from the FIFO buffer 30-2 into data which the non-volatile memory 20 may process during a write operation or a program operation. When the non-volatile memory 20 is embodied in a NAND flash memory, the non-volatile memory interface 30-1 may be embodied in a NAND interface.

The FIFO buffer (or memory) 30-2 may be input from and output to the non-volatile memory interface 30-1 object data such as a code word or a chunk, according to a FIFO method.

The memory device 30-3 which may perform a function of a data buffer stores data output from the FIFO buffer 30-2 successively. For example, the memory device 30-3 may be embodied in a dual-port static random access memory (DPSRAM). For example, the memory device 30-3 may be embodied in a plurality of DPSRAMs. Here, each of the plurality of DPSRAMs may perform a write operation or a read operation independently.

The ECC block (or error correction unit) 30-4 which may be embodied in a circuitry, a logic, a code or a combination of these calculates a plurality of error locations ELs necessary for correcting a plurality of errors included in the data, e.g., a code word or a chunk, which is input successively through the non-volatile memory interface 30-1, and output a plurality of calculated error locations ELs to the correction DMA 30-5.

In addition, the ECC block 30-4 determines if a coefficient of each term of which a degree is equal to or greater than a degree of a reference-degree term, in an error location polynomial for a last chunk among a plurality of chunks included in object data, e.g., a page data, is all zero, and outputs an indication signal ELPI which controls an output timing of an error-corrected first chunk stored in the memory device 30-3 to the host DMA 30-8 based on the determination result.

For example, when a coefficient of each term of which degree is equal to or greater than a degree of a reference-degree term, in an error location polynomial for a last chunk of object data, is all zero, the ECC block 30-4 generates an indication signal ELPI having a high level. According to an exemplary embodiment, information DEC on the reference-degree term may be set from outside. For example, the information DEC may be information which may be programmed by a manufacturer. The information on the reference-degree term may be set in advance in an error locator polynomial generator circuit 120 as described below in reference to FIG. 2.

The correction DMA 30-5 receives a chunk read from the memory device 30-3 by chunk and a plurality of error locations ELs output from the ECC block 30-4, corrects errors included in the chunk by using the plurality of error locations ELs, and stores an error-corrected chunk in the memory device 30-3. Accordingly, the correction DMA 30-5 performs a function of an error corrector.

The correction DMA 30-5 generates an error correction completion signal ECS having a high level after error correction for a last chunk of the object data is completed.

The host interface 30-6 interfaces data transmitted or received between the memory device 30-3 and the host DMA 30-8.

The logic gate 30-7 transmits a transmission control signal TCS to the host DMA 30-8 in response to an indication signal ELPI output from the ECC block 30-4 and an error correction completion signal ECS output from the correction DMA 30-5. The logic gate 30-7 may be embodied in an OR gate.

The host DMA 30-8 connected between the host interface 30-6 and the host 40 may read first an error-corrected first chunk stored in the memory device 30-3 and transmit it to the host 40 in response to a transmission control signal TCS having a high level.

The host DMA 30-8 may read an error-corrected first chunk from the memory device 30-3 and transmit it to the host 40 in response to an indication signal ELPI having a high level or an error correction completion signal ECS having a high level.

When a first chunk of object data is transmitted to the host 40 by the host DMA 30-8 according to the indication signal ELPI, the ECC block 30-4 may calculate roots of an error location polynomial for a last chunk of the object data and transmit a plurality of error locations ELs corresponding to the roots to the correction DMA 30-5.

The host DMA 30-8 is embodied between the host interface 30-6 and the host 40 as illustrated in FIG. 1. However, the host DMA 30-8 may be embodied between the memory device 30-3 and the host interface 30-6 according to an exemplary embodiment.

Figure 2:
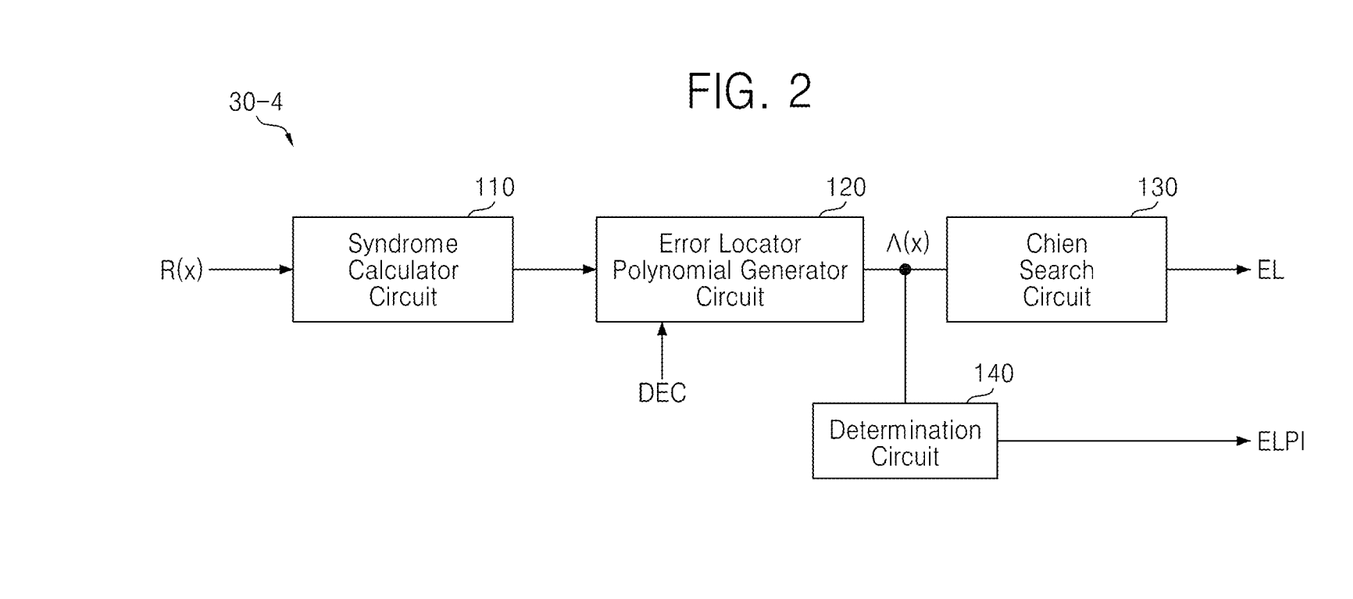
FIG. 2 is a block diagram of an error correction code block illustrated in FIG. 1, according to an exemplary embodiment.
Figure 3:
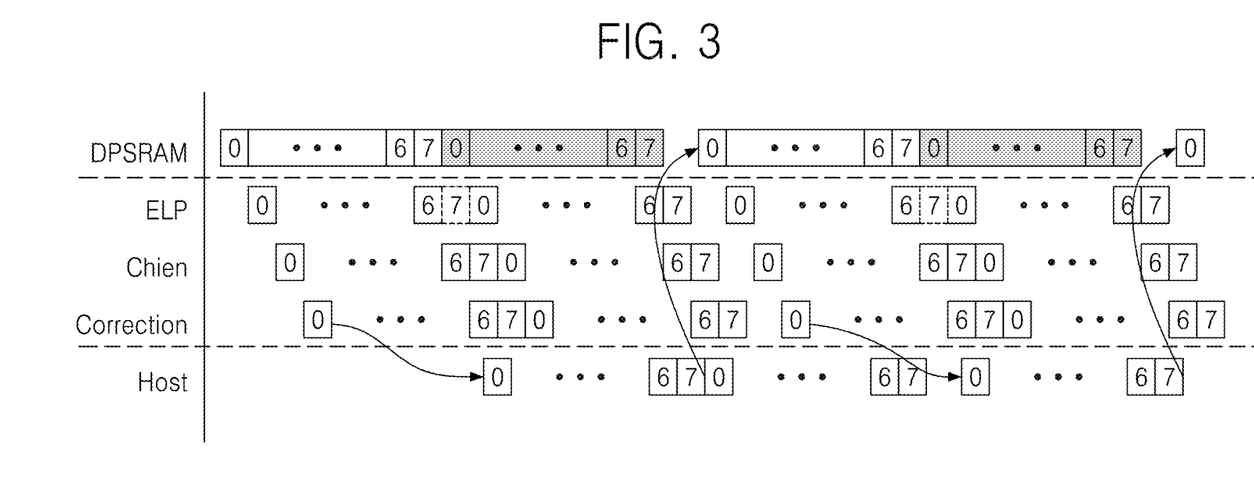
FIG. 3 is a timing diagram for explaining an operation of a memory controller illustrated in FIG. 1, according to an exemplary embodiment.
Figure 4:
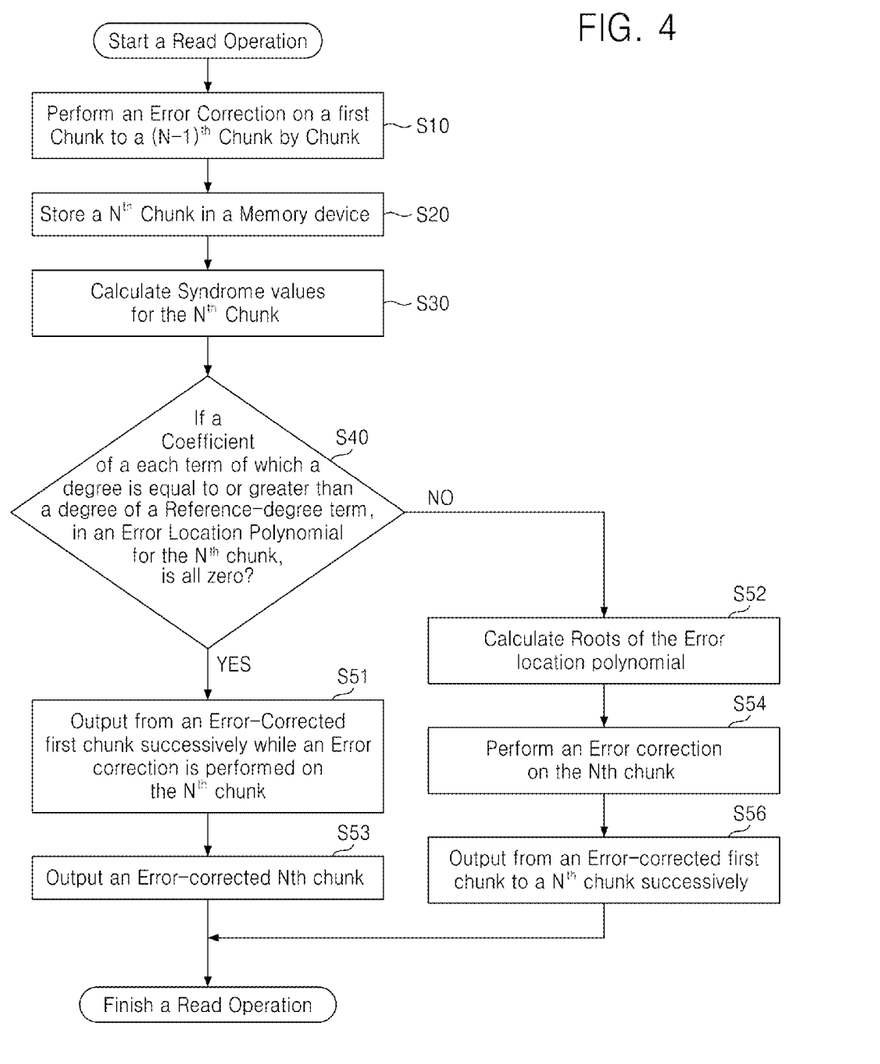
FIG. 4 is a flowchart for explaining an operation of the memory controller illustrated in FIG. 1, according to an exemplary embodiment.

FIG. 2 is a block diagram of the ECC block 30-4 illustrated in FIG. 1, FIG. 3 is a timing diagram for explaining an operation of the memory controller 30 illustrated in FIG. 1, and FIG. 4 is a flowchart for explaining an operation of the memory controller 30 illustrated in FIG. 1.

According to an exemplary embodiment, the ECC block 30-4 includes a syndrome calculator circuit 110, an error locator polynomial generator circuit 120, a Chien search circuit 130 and a determination circuit 140 as illustrated in FIG. 2. Functions of each circuit of the ECC block 30-4 are described below when a read operation of the memory controller 30 is explained in detail referring to FIGS. 1 to 4.

It is assumed that object data, e.g., each page data, includes N chunks 0 to 7 (i.e., N is eight), the memory device 30-3 includes four DPSRAMs, a first chunk 0 to a fourth chunk 3 among eight chunks 0 to 7 of a first page data PD1 are stored in a first DPSRAM, a fifth chunk 4 to an eighth chunk 7 of the first page data PD1 are stored in a second DPSRAM, a first chunk 0 to a fourth chunk 3 among eight chunks 0 to 7 of a second page data PD2 are stored in a third DPSRAM, and a fifth chunk 4 to an eighth chunk 7 of the second page data PD2 are stored in a fourth DPSRAM.

The first chunk 0 of the first page data PD1 is transmitted to the FIFO 30-2 and the ECC block 30-4, and the first chunk 0 transmitted to the FIFO 30-2 is stored in the first DPSRAM.

The syndrome calculation circuit 110 calculates syndrome values $S(x)$ for the first chunk 0, the error locator polynomial generator circuit 120 calculates an error location polynomial $\Lambda(x)$ from the syndrome values $S(x)$ (ELP of FIG. 3), the Chien search circuit 130 calculates roots of the error location polynomial $\Lambda(x)$ by using a Chien search method and calculates a plurality of error locations ELs according to the calculation result (Chien of FIG. 3).

The determination circuit 140 determines if a chunk in process in the ECC block 30-4 is a last chunk of the object data according to chunk information included in each chunk, determines if a coefficient of each term of which a degree is equal to or greater than a degree of a reference-degree term, in an error location polynomial $\Lambda(x)$ for the last chunk, is all zero when the chunk in process is the last chunk, and outputs an indication signal ELPI having a high level if it is determined that the coefficient of each term is all zero.

According to chunk information included in the first chunk 0, the determination circuit 140 outputs an indication signal ELPI having a low level. The correction DMA 30-5 receives a plurality of error locations ELs for the first chunk and the first chunk of the first page data PD1 read from the first DPSRAM, corrects an error included in the first chunk 0 by using the plurality of error locations ELs and stores the error-corrected first chunk in the first DPSRAM again (Correction of FIG. 3).

Identically or similarly to the above method, a read operation of the memory controller 30 is described below in reference to FIG. 4, according to an exemplary embodiment. First, the correction DMA 30-5 performs error correction by chunk on the first chunk 0 to an $(n-1)^{th}$ chunk, i.e., a seventh chunk 6, of the first page data PD1 (S10). An $N^{th}$ chunk of the first page data PD1, i.e., an eighth chunk 7, is not only transmitted to the ECC block 30-4, but also stored in the memory device 30-3 through the FIFO 30-2 at the same time (S20).

The syndrome calculation circuit 110 calculates syndrome values S(x) for the eighth chunk 7 (S30). The error locator polynomial generator circuit 120 calculates an error location polynomial Λ(x) using the syndrome values S(x). The Chien search circuit 130 calculates roots of the error location polynomial Λ(x) and outputs a plurality of error locations ELs corresponding to the calculated roots.

The determination circuit 140, based on chunk information included in the eighth chunk 7, determines if the eighth chunk 7 is a last chunk of the first page data PD1 and if a coefficients of each term equal to or greater than a degree of a reference-degree term, in an error location polynomial Λ(x) for the eighth chunk 7, is all zero (S40).

If it is determined that the coefficient of each term is all zero, the determination circuit 140 generates an indication signal ELPI having a high level. Accordingly, the logic gate 30-7 transmits a transmission control signal TCS having a high level to the host DMA 30-8, so that the host DMA 30-8 reads first the first chunk 0 of an error-corrected first page data PD1 and transmits it to the host 40 in response to the transmission control signal TCS having a high level.

That is, while the correction DMA 30-5 performs error correction on the eighth chunk 7, the host DMA 30-8 transmits first the error-corrected first chunk 0 to the host 40 in response to the transmission control signal TCS having a high level (S51). Specifically, when the error-corrected first chunk 0 is output to the host 40, the Chien search circuit 130 calculates roots of the error location polynomial Λ(x) of the eighth chunk 7 and outputs a plurality of error locations ELs corresponding to the calculated roots, and the correction DMA 30-5 performs error correction on the eighth chunk 7 using the plurality of error locations ELs.

After the error correction on the eighth chunk 7 is completed, the error-corrected eighth chunk 7 is transmitted to the host 40 through the host interface 30-6 under the control of the host DMA 30-8 (S53).

That is, the memory controller 30 of the exemplary embodiments may not output the error-corrected first chunk 0 after error correction on the last chunk of the object data, i.e., the eighth chunk 7, is completed, but output it when the coefficient of each term of which the degree is equal to or greater than the degree of the reference-degree term of the $N^{th}$ chunk 7 is all zero. Thus, the memory controller 30 may increase a speed of the read operation.

If a coefficient of any term of which the degree is equal to or greater than the degree of the reference-degree term is not zero, the determination circuit 140 generates an indication signal ELPI having a low level. The Chien search circuit 130 calculates roots of an error location polynomial Λ(x) of the eighth chunk 7 and outputs a plurality of error locations ELs corresponding to the calculated roots (S52).

The correction DMA 30-5 performs error correction on the eighth chunk 7 using the plurality of error locations ELs (S54). After the error correction on the eighth chunk 7 is completed, the correction DMA 30-5 outputs an error correction completion signal ECS having a high level. Accordingly, the logic gate 30-7 outputs a transmission control signal TCS having a high level.

The host DMA 30-8 reads the error corrected first chunk 0 to the error corrected eighth chunk 7 by chunk successively and transmits them to the host 40 in response to the transmission control signal TCS having a high level (S56). Accordingly, a read operation for the first page data PD1 is completed.

A read operation for a second page data PD2 or another page data is the same as the read operation for the first page data as described thus far, so that explanation for this is omitted.

Figure 5:
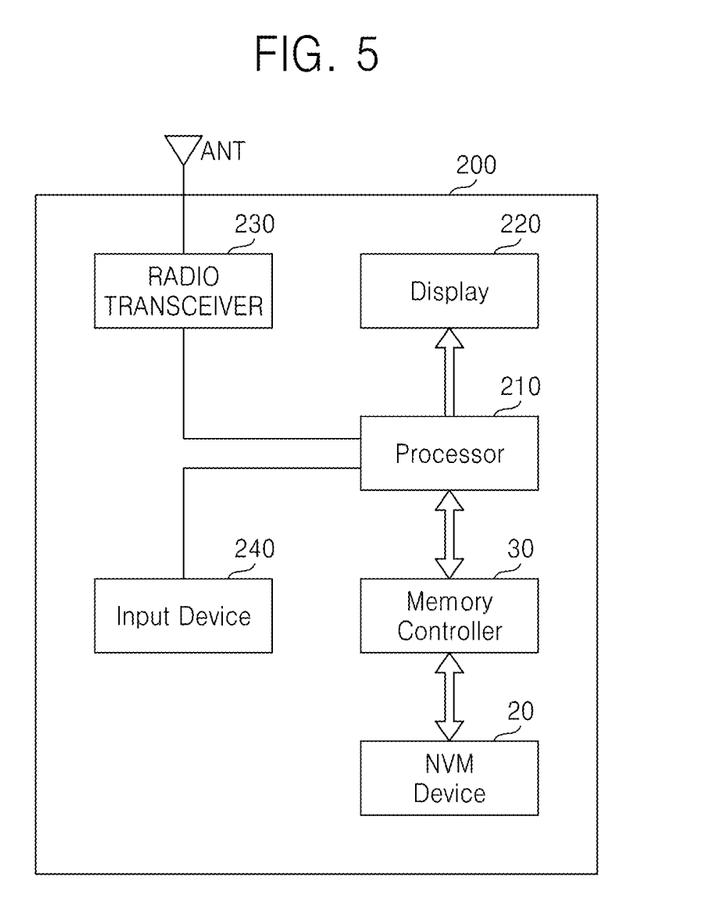
FIG. 5 is an exemplary embodiment of an electronic device including the memory system illustrated in FIG. 1.

FIG. 5 is an exemplary embodiment of an electronic device including the memory system 10 illustrated in FIG. 1. Referring to FIGS. 1 to 5, an electronic device 200 may be embodied in a cellular phone, a smart phone, a personal digital assistant (PDA), a portable multi-media player (PMP), a tablet PC or a radio communication device, not being limited thereto.

The electronic device 200 includes the non-volatile memory 20 like a NAND flash memory, the memory controller 30 which may control an operation of the non-volatile memory 20, and a processor 210 which may perform a function of the host 40 of FIG. 1.

The memory controller 30 may control not only an output timing of an error-corrected first chunk stored in the memory device 30-3 as described above, but control a data access operation of the non-volatile memory 20, e.g., a program operation, an erase operation or a read operation, under the control of the processor 110.

Data programmed in the non-volatile memory 20 may be displayed through a display 220 according to a control of the processor 210 and/or the memory controller 30.

A radio transceiver 230 may transmit or receive a radio signal through an antenna ANT. For example, the radio transceiver 230 may change a radio signal received through the antenna ANT into a signal which may be processed by the processor 210. Accordingly, the processor 210 may process a signal output from the radio transceiver 230 and transmit the processed signal to the memory controller 30 or the display 20. The memory controller 30 may program a signal processed by the processor 210 in the non-volatile memory 20. In addition, the radio transceiver 230 may convert a signal output from the processor 210 into a radio signal, and output the converted radio signal to an external device through the antenna ANT.

An input device 240 may be a device which inputs a control signal for controlling an operation of the processor 210 or data to be processed by the processor 210. It may be embodied in a pointing device like a touch pad and a computer mouse, a keypad or a keyboard.

The processor 210 may control an operation of the display 220 so that data output from the memory controller 30, data output from the radio transceiver 230 or data output from the input device 240 may be displayed through the display 220. According to an exemplary embodiment, the memory controller 30 which may control an operation of the non-volatile memory 20 may be embodied in a part of the processor 210 or a separate chip from the processor 210. Each element 30, 210, 220, 230 and 240 may communicate to each other through a bus.

Figure 6:
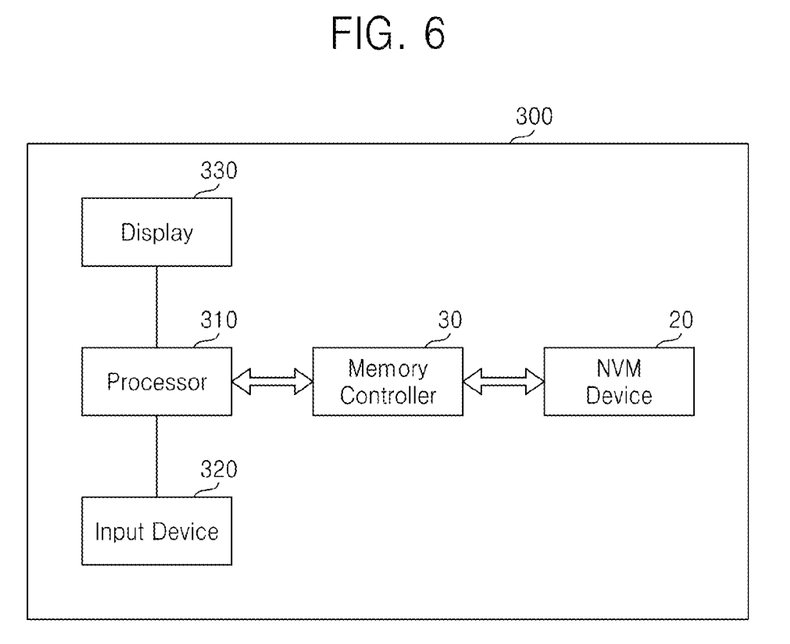
FIG. 6 is another exemplary embodiment of the electronic device including the memory system illustrated in FIG. 1.

FIG. 6 is another exemplary embodiment of an electronic device including the memory system 10 illustrated in FIG. 1. An electronic device 300 illustrated in FIG. 6 may be embodied in a personal computer (PC), a tablet PC, a laptop computer, an e-reader, a PDA, a PMP, a MP3 player, or a MP4 player.

The electronic device 300 includes the non-volatile memory 20 like a NAND flash memory, the memory controller 30 which may control an operation of the non-volatile memory 20, and a processor 310 which may perform a function of the host 40 of FIG. 1.

The memory controller 30, under a control of the processor 310, may transmit data stored in the non-volatile memory 20 to a display 330 according to data input through an input device 320. For example, the input device 320 may be embodied in a pointing device like a touch pad or a computer mouse, a keypad or a keyboard.

The processor 310 may control a general operation of the electronic device 300 and an operation of the memory controller 30.

The memory controller 30 which may control an operation of the non-volatile memory 20 according to an exemplary embodiment may be embodied in a part of the processor 310 or a separate chip from the processor 310. Each element 30, 310, 320 and 330 may communicate to each other through a bus.

Figure 7:
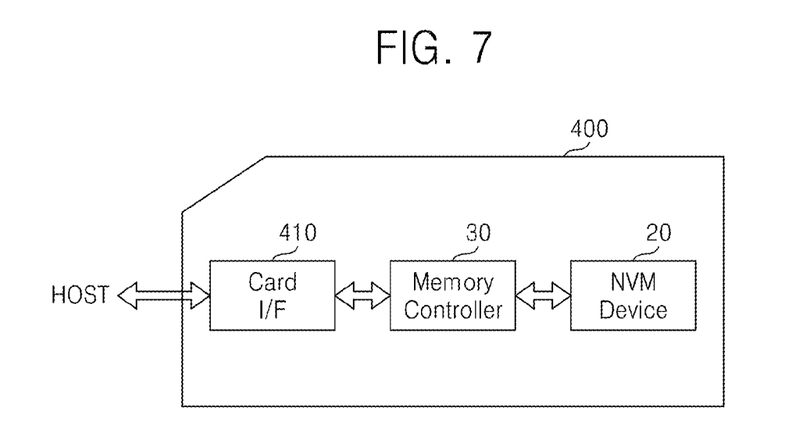
FIG. 7 is still another exemplary embodiment of the electronic device including the memory system illustrated in FIG. 1.

FIG. 7 is still another exemplary embodiment of an electronic device including the memory system 10 illustrated in FIG. 1. An electronic device 400 illustrated in FIG. 7 may be embodied in a memory card or a smart card. The electronic device 400 includes the non-volatile memory 20, the memory controller 30 and a card interface 410.

The memory controller 30 may control data communication between the non-volatile memory device 20 and the card interface 410. According to an exemplary embodiment, the card interface 410 may be a secure digital (SD) card interface or a multi-media card (MMC) interface; however, it is not restricted thereto.

The card interface 410 may interface data communication between a HOST and the memory controller 30 according to a protocol used by the HOST. The HOST may be embodied in an identical or similar structure to the host 40 illustrated in FIG. 1.

The card interface 410 may transmit data output from the host to the memory controller 30 to perform a program operation, and transmit read data output from the memory controller 30 according to a read operation to the HOST. According to an exemplary embodiment, the card interface 410 may process data according to a universal serial bus (USB) protocol or an interchip (IC)-USB protocol.

Here, each interface 30-1, 30-6 or 410 may mean hardware which may support a data processing protocol used by the host, software embedded in the hardware, or a data transmission method.

When the electronic device 400 is electrically connected to a host such as a personal computer (PC), a tablet PC, a digital camera, a digital audio player, a cellular phone, a smart phone, console video game hardware, or a digital set-top box, an interface (not shown) embodied inside the host may perform data communication with the non-volatile memory 20 through the card interface 410 and the memory controller 30 according to a control of a micro-processor (not shown) embodied inside the host. The card interface 410 may be embodied in additional hardware. According to an exemplary embodiment, the host interface 30-6 may perform a function of the card interface 410.

Figure 8:
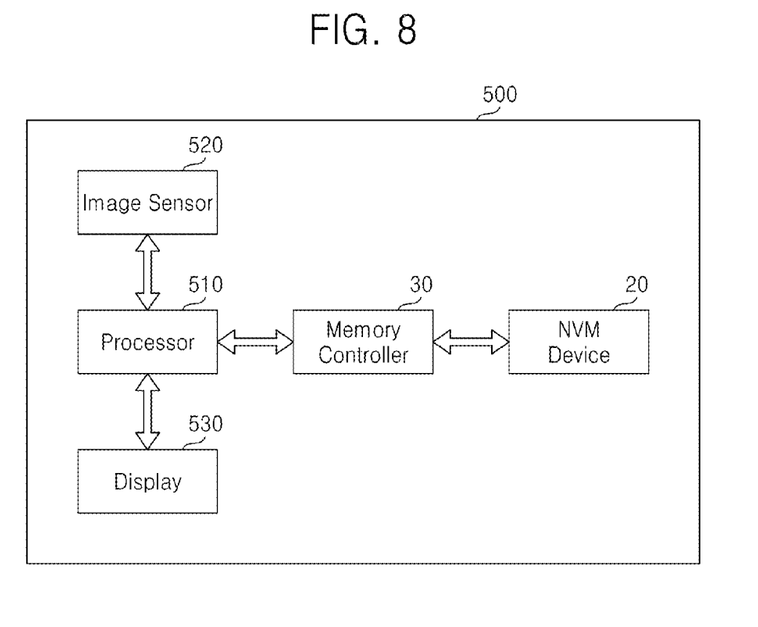
FIG. 8 is still another exemplary embodiment of the electronic device including the memory system illustrated in FIG. 1.

FIG. 8 is still another exemplary embodiment of the electronic device including the memory system 10 illustrated in FIG. 1. An electronic device 500 illustrated in FIG. 8 may be embodied in an image processing device, e.g., a digital camera, a cellular phone with an embedded digital camera, a smart phone with an embedded digital camera or a tablet PC with an embedded digital camera.

The electronic device 500 includes the non-volatile memory 20, the memory controller 30 which may control a data processing device of the non-volatile memory 20, e.g., a program operation, an erase operation or a read operation, and a processor 510 which may perform a function of the host 40 illustrated in FIG. 1.

An image sensor 520 of the electronic device 500 converts an optical image into a digital image, and a converted digital image is transmitted to the processor 510 or the memory controller 30. According to a control of the processor 510, the converted digital image may be displayed through a display 530 or stored in the non-volatile memory 20 through the memory controller 30.

Additionally, data stored in the non-volatile memory 20 may be displayed on the display 530 according to a control of the processor 510 or the memory controller 30. The memory controller 30 which may control an operation of the non-volatile memory 20 according to an exemplary embodiment may be embodied in a part of the processor 510 and also embodied in a separate chip from the processor 510. Each element 30, 510, 520 and 530 may perform data communication through a bus.

Figure 9:
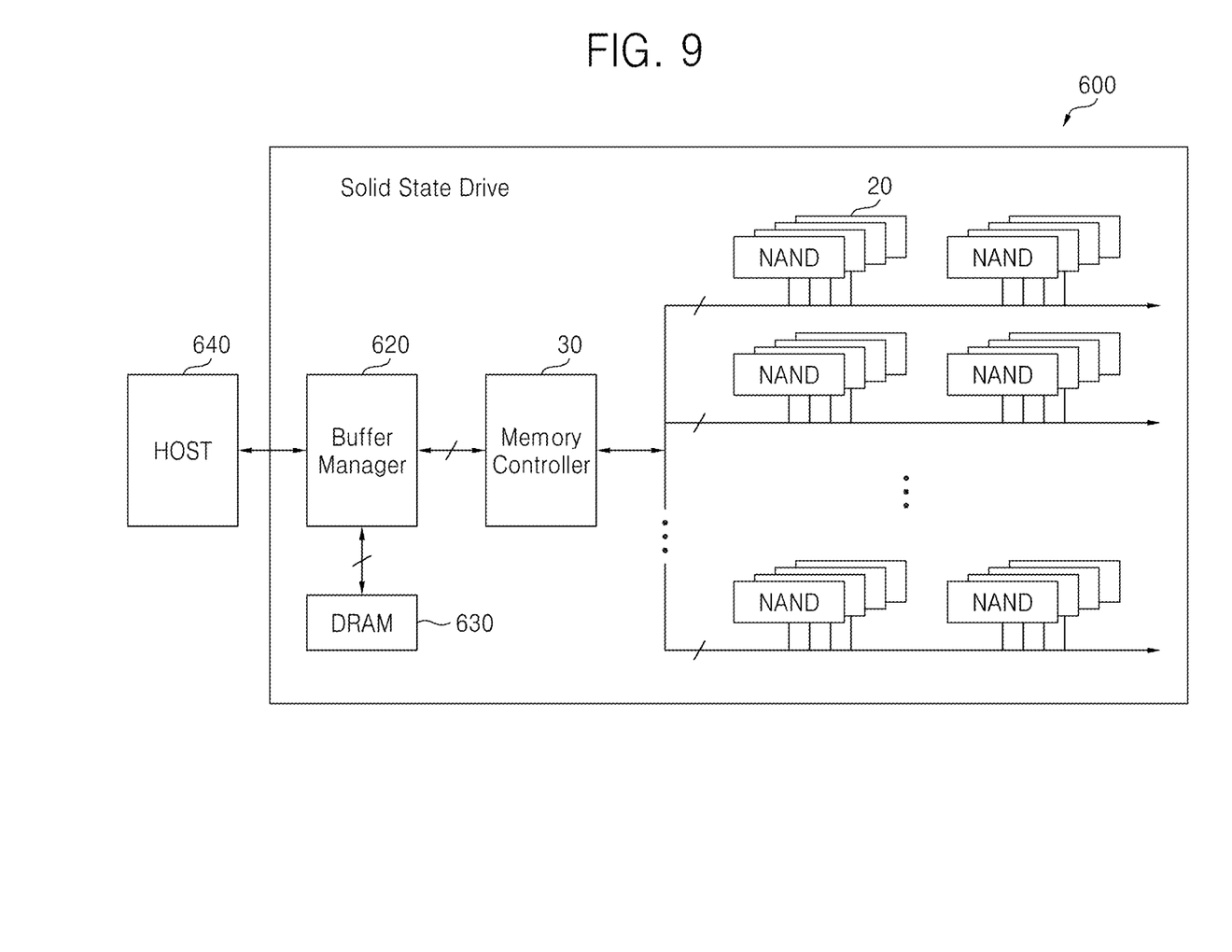
FIG. 9 is still another exemplary embodiment of the electronic device including the memory system illustrated in FIG. 1.

FIG. 9 is still another exemplary embodiment of an electronic device including the memory system 10 illustrated in FIG. 1. Referring to FIG. 9, an electronic device 600 may be embodied in a data processing device like a solid state drive (SSD).

The electronic device 600 may include a plurality of non-volatile memories 20, the memory controller 30 which may control a data processing operation of each of the plurality of non-volatile memories 20, a volatile memory 630 like a dynamic random access memory (DRAM), and a buffer manager 620 controlling storage of data, which is transmitted or received between the memory controller 30 and a host 640, in the volatile memory 630. The buffer manager 620 may be embodied in a circuitry, a logic, a code or a combination of these.

The host 640 may perform the same function as the host 40 illustrated in FIG. 1. Each of the plurality of non-volatile memories 20 may be embodied in a NAND flash memory.

Each electronic device 200, 300, 400, 500 and 600 explained referring to FIGS. 5 to 9 is schematically illustrated based on a data processing flow. Accordingly, a physical connection relation for a data communication, e.g., a structure of a bus, may be changed variously between elements embodied inside each electronic device 200, 300, 400, 500 and 600.

The memory controller according to the above exemplary embodiments may output an error-corrected first chunk regardless of completion of error correction on the last chunk. Accordingly, performance of a read operation is improved.

Although a few exemplary embodiments have been shown and described, it will be appreciated by those skilled in the art that changes may be made in these embodiments without departing from the principles and spirit of the inventive concept, the scope of which is defined in the appended claims and their equivalents.

What is claimed is:

1. A method for operating a memory controller comprising:
   performing error correction on data, comprising a plurality of chunks, in a unit of a chunk;
   determining whether a coefficient of each term of which a degree is equal to or greater than a degree of a reference-degree term, in an error location polynomial for a last chunk among the plurality of chunks, is all zero; and controlling an output time of a first chunk, which is error-corrected, among the plurality of chunks, from the memory controller, based on a result of the determining, wherein the controlling the output time comprises:

outputting the error-corrected first chunk before error correction on the last chunk is completed if it is determined that the coefficient of the each term is all zero; and performing error correction on the last chunk before outputting the error-corrected first chunk if it is determined that a coefficient of any term of which a degree is equal to or greater than the degree of the reference-degree term, in the error location polynomial for the last chunk among the plurality of chunks, is not zero.

2. The method of claim 1, wherein the controlling the output time comprises outputting the error-corrected first chunk while a root of the error location polynomial for the last chunk is calculated or while error correction on the last chunk is performed using a plurality of error locations corresponding to the calculated root if it is determined that the coefficient of the each term is all zero.

3. A memory controller comprising:
a memory interface through which data is input; and
an error correction code (ECC) block which controls:
to perform error correction on the data, comprising a plurality of chunks in a unit of a chunk;
to determine whether a coefficient of each term of which a degree is equal to or greater than a degree of a reference-degree term, in an error location polynomial for a last chunk among the plurality of chunks, is all zero; and
to determine an output time of a first chunk, which is error-corrected, among the plurality of chunks, from the memory controller, based on a result of the determining whether the coefficient of the each term is all zero,
wherein the ECC block controls:
to output the error-corrected first chunk before error correction on the last chunk is completed if it is determined that the coefficient of each term is all zero; and
to perform error correction on the last chunk before outputting the error-corrected first chunk if it is determined that a coefficient of any term of which a degree is equal to or greater than the degree of the reference-degree term, is not zero.

4. The memory controller of claim 3, wherein the ECC block controls to output the error-corrected first chunk while a root of the error location polynomial for the last chunk is calculated or while error correction on the last chunk is performed using a plurality of error locations corresponding to the calculated root, if it is determined that the coefficient of the each term is all zero.

5. The memory controller of claim 3, wherein the error correction code block calculates a syndrome value for each of the plurality of chunks, calculates an error location polynomial for the each chunk from the calculated syndrome value, calculates a root of the calculated error location polynomial for the each chunk, outputs at least one error location corresponding to the calculated root, and generates an indication signal based on the result of the determination, and
wherein the memory controller further comprises:
a memory which stores the data input through the memory interface;
a correction direct memory access (DMA) which corrects an error included in each of the plurality of chunks stored in the memory using the at least one error location on each of the plurality of chunks and stores each of the error-corrected chunks in the memory; and
a host DMA which determines the output time of the error-corrected first chunk stored in the memory in response to an indication signal output from the ECC block.

6. The memory controller of claim 5, wherein, if the ECC block determines that the coefficient of the each term is all zero, the host DMA outputs the error-corrected first chunk in response to the indication signal output from the ECC block while the ECC block calculates the root of the error location polynomial on the last chunk.

7. The memory controller of claim 5, further comprising:
an OR gate which receives the indication signal which is output from the ECC block and an error correction completion signal which is output from the correction DMA and indicates that the error correction on the last chunk is completed, and performs an operation on the two signals to generate a transmission control signal,
wherein the host DMA controls the output time of the error-corrected first chunk based on the transmission control signal.

8. The memory controller of claim 5, wherein the host DMA outputs the error-corrected first chunk output through a host interface to a host.

9. A memory controller comprising:
an interface unit through which data comprising a plurality of chunks is input, at least one of the plurality of chunks containing an error;
a memory which stores the data input through the interface unit; and
an error correction unit which controls a time to begin to output the plurality of chunks from the memory to a host by determining a coefficient value of at least one predetermined term of an error location polynomial for a last chunk in the plurality of chunks,
wherein the error correction unit corrects the error in the at least one chunk and outputs the plurality of chunks from the memory to the host, based on the time to begin to output the plurality of chunks,
wherein the error correction unit controls the time to begin to output the plurality of chunks by determining if a coefficient of each term of which a degree is equal to or greater than a degree of a reference-degree term, in the error location polynomial for the last chunk, is all zero,
wherein the error correction unit determines an output time of an error-corrected first chunk based on a result of the determining if the coefficient of the each term is all zero,
wherein the error correction unit outputs the error-corrected first chunk while a root of the error location polynomial for the last chunk is calculated or while error correction on the last chunk is performed using at least one error location corresponding to the calculated root, if it is determined that the coefficient of the each term is all zero, and
wherein the error correction unit performs error correction on the last chunk before outputting the error-corrected first chunk if it is determined that a coefficient of any term of which a degree is equal to or greater than the degree of the reference-degree term, in the error location polynomial for the last chunk among the plurality of chunks, is not zero.

* * * * *